US007068894B2

(12) United States Patent
Prucnal et al.

(10) Patent No.: US 7,068,894 B2
(45) Date of Patent: Jun. 27, 2006

(54) ALL-OPTICAL WAVELENGTH CONVERTER BASED ON SAGNAC INTERFEROMETER WITH AN SOA AT ASYMMETRIC POSITION

(75) Inventors: Paul R. Prucnal, Princeton, NJ (US); Ivan Glesk, Princeton, NJ (US); Lei Xu, Princeton, NJ (US); Varghese Baby, Princeton, NJ (US)

(73) Assignee: Trustees of Princeton University, Princeton, NJ (US)

( * ) Notice: Subject to any disclaimer, the term of this patent is extended or adjusted under 35 U.S.C. 154(b) by 0 days.

(21) Appl. No.: 10/931,931

(22) Filed: Sep. 1, 2004

(65) Prior Publication Data

US 2005/0105847 A1 May 19, 2005

Related U.S. Application Data

(60) Provisional application No. 60/499,536, filed on Sep. 2, 2003.

(51) Int. Cl.
*G02F 2/02* (2006.01)
*G02F 1/35* (2006.01)

(52) U.S. Cl. ...................... 385/122; 359/326; 359/329

(58) Field of Classification Search ................ 385/122; 359/326–332
See application file for complete search history.

(56) References Cited

U.S. PATENT DOCUMENTS

2002/0176152 A1* 11/2002 Parolari et al. ............. 359/326
2005/0012983 A1* 1/2005 Parolari et al. ............. 359/326

OTHER PUBLICATIONS

Eiset M. et al. "SLALOM: Semiconductor Laser Amplifier in a Loop Mirror." Journal of Lightwave Technology vol. 13, No. 10, Oct. 1995.*
Rusner, Robert J., et al. "Interferometric ultrasound SOA-based optical switches: From devices to applications," Kluwer Academic Publishers, Printed in the Netherlands, 2001, pp. 841-874.
Eiselt, M., et al. "SLALOM: Semiconductor Laser Amplifier in a Loop Mirror," Journal of Lightwave Technology, vol. 13, No. 10, Oct. 1995, pp. 2099-2112.
Chan, Kit., et al. "Waveform Restoration in Semiconductor Optical Amplifier Using Fiber Loop Mirror," IEEE Photonics Technology Letters, vol. 14, No. 7, Jul. 2002, pp. 995-997.
Mortimore, David B., "Fiber Loop Reflectors," Journal of Lightwave Technology, vol. 6, No. 7, Jul. 1988, pp. 1217-1224.
McBride, R., et al. "A passive phase recovery technique for Sagnac interferometers based on controlled loop birefringence," Journal of Modern Optics, vol. 39, No. 6, 1992, pp. 1309-1320.
Agrawal, Govind P., "Self-Phase Modulation and Spectral Broadening of Optical Pulses in Semiconductor Laser Amplifiers," Journal of Quantum Electronics, vol. 25, No. 11, Nov. 1989, pp. 2297-2306.
Eiselt, et al. Slalom: Semiconductor Laser Amplifier in a Loop Mirror, Oct. 10, 1995.
International Search Report and Written Opinion issued for PCT/US04/28588 dated Oct. 14, 2005.

* cited by examiner

*Primary Examiner*—John D. Lee
*Assistant Examiner*—Rhonda S. Peace
(74) *Attorney, Agent, or Firm*—Fulbright & Jaworski LLP

(57) ABSTRACT

According to at least one embodiment, a system comprises a Sagnac interferometric loop and a semiconductor optical amplifier (SOA) located at an asymmetric position on that loop, wherein the Sagnac interferometric loop and the SOA are operable to perform signal conversion on an input signal.

18 Claims, 8 Drawing Sheets

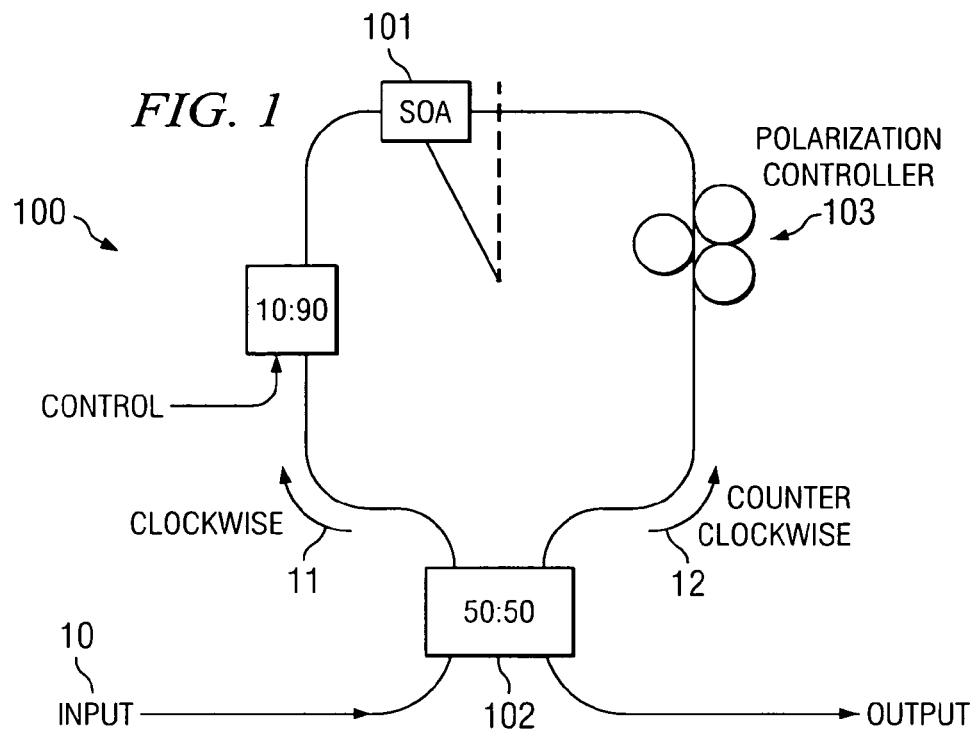
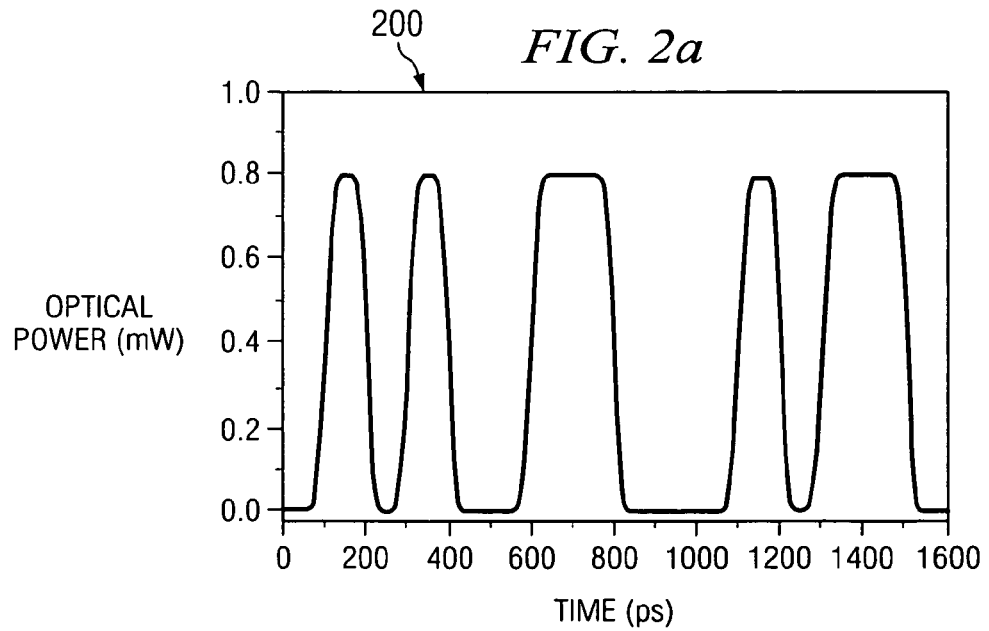

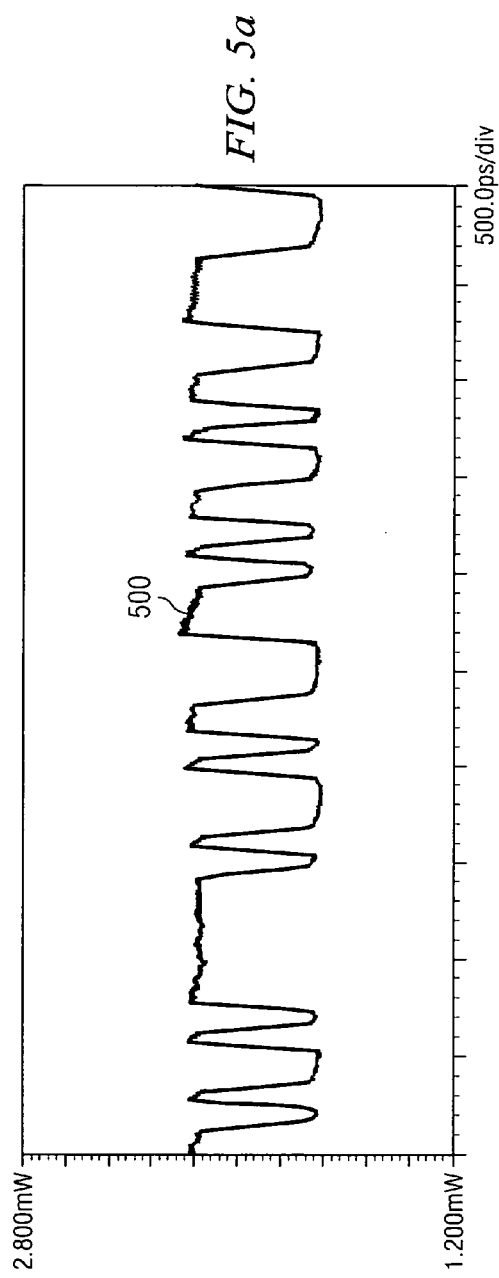
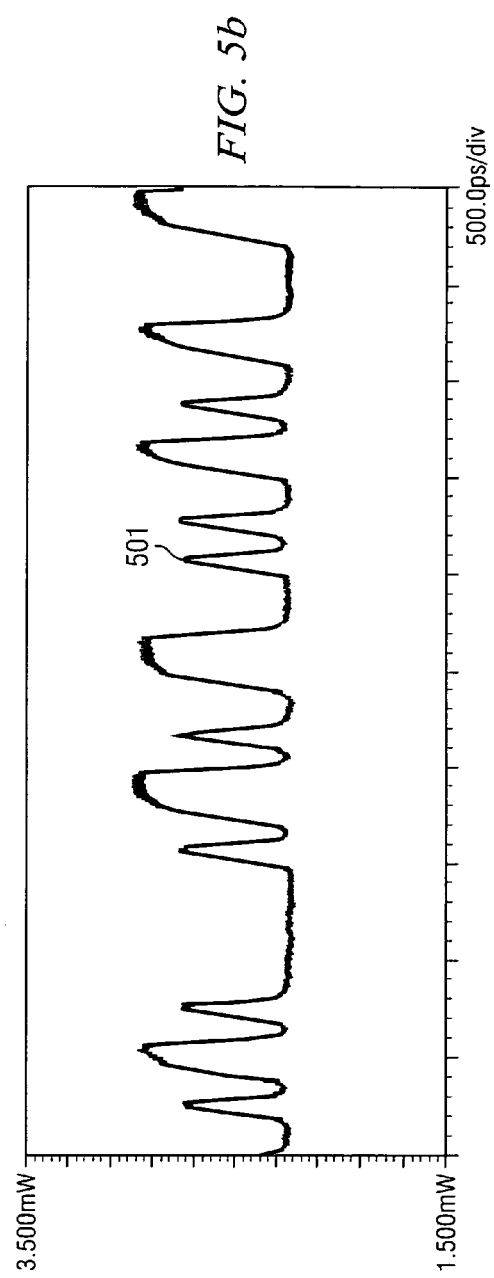

ALL-OPTICAL WAVELENGTH CONVERTER BASED ON SAGNAC INTERFEROMETER WITH AN SOA AT ASYMMETRIC POSITION

CROSS REFERENCE TO RELATED APPLICATIONS

This application claims priority to U.S. Provisional Application 60/499,536, filed Sep. 2, 2003, the disclosure of which is hereby incorporated herein by reference.

GOVERNMENT LICENSE RIGHTS

The U.S. Government has a paid-up license in this invention and the right in limited circumstances to require the patent owner to license others on reasonable terms as provided by the terms of ARO MURI DAAD 19-00-1-0165 awarded by the Army Research Office.

TECHNICAL FIELD

This invention relates to wavelength conversion in a fiber optics-based communication system.

BACKGROUND

In communication systems, signals are often transmitted over very long distances. Such long distances may cause signals to become degraded, for example, by attenuation and interference. Accordingly, some systems use signal converters to receive a degraded signal and restore its shape and amplitude.

Fiber optics-based communication systems in the past have used electrical signal converters that receive the light signal from the optical transmission medium, change that signal to an electric signal, restore the shape and amplitude, and change the signal back to light for transmission over another optical medium. Advances in fiber optics technology have allowed for the development of optical wavelength conversion, which performs the conversion without changing the signal to an electric signal. However, traditional optical wavelength converters have suffered from the effects of the pattern dependent effect and poor extinction ratios.

BRIEF SUMMARY

The present invention is directed to a system and method in which various embodiments demonstrate wavelength conversion using a Sagnac interferometer with an SOA. Some example embodiments provide for the alleviation of pattern-dependent effect and the improvement of extinction ratios using an optimal interference phase bias. According to at least one embodiment, a system comprises a Sagnac interferometric loop and a semiconductor optical amplifier (SOA) located at an asymmetric position on that loop, wherein the Sagnac interferometric loop and the SOA are operable to perform signal conversion on an input signal.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings, in which:

FIG. 1 is an illustration of the structure of a Sagnac interferometric loop with an SOA at an asymmetric position, adapted according to various embodiments;

FIG. 2($b$) is an illustration of a signal produced from XGM effect conversion;

FIG. 2($c$) is an illustration of a signal produced from conversion using a Sagnac interferometer, adapted according to various embodiments;

FIG. 2($d$) is an illustration of a signal produced from conversion using a Sagnac interferometer, adapted according to various embodiments;

FIGS. 4($b$) and ($c$) are eye diagrams of a wavelength converted signals according to various embodiments;

FIG. 4($d$) shows the eye diagram of a converted data signal using XGM effect;

FIG. 5($b$) is an illustration of the data pattern of the converted signal using XGM effect;

FIG. 5($c$) is an illustration of a data pattern of a converted signal using the Sagnac interferometric loop, as illustrated in FIG. 3;

DETAILED DESCRIPTION

Figure 2B:
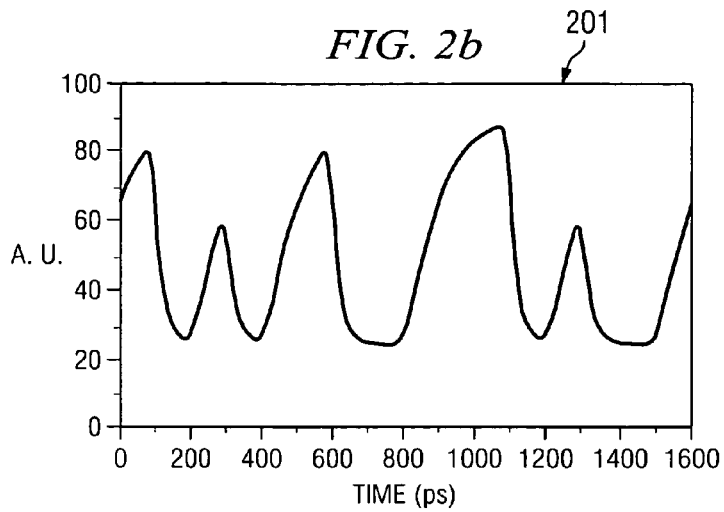
FIG. 2($a$) is an illustration of an example input NRZ signal, which may be used with some embodiments of the present invention.

When a Semiconductor Optical Amplifier (SOA) is placed at an off-center position inside a Sagnac interferometric loop, the present invention demonstrates multiple functionalities using short optical Return-to-Zero (RZ) signals, such as demultiplexing for optical time division multiplexing (OTDM) systems, optical switching and packet routing, optical sampling, optical regeneration, and the like. For Non-Return-to-Zero (NRZ) signals, waveform restoration using the present invention is possible. In one embodiment, the present invention provides all-optical wavelength conversion for NRZ signals with a fiber-based Sagnac interferometric loop with an SOA at an asymmetric position. Analysis shows that the phase bias of the interference is critical for the wavelength conversion operation. With the Sagnac interferometric structure, the present invention can provide reduced pattern dependent effect and higher extinction ratios when compared to Cross Gain Modulation (XGM)-based wavelength converters. As explained further below, in one embodiment, the 10 Gb/s Bit Error Rate (BER) measurement shows a reduced power penalty of the converted signal using a Sagnac interferometric loop.

While other systems have adopted Mach-Zehnder and Michelson interferometers together with SOAs to demonstrate wavelength conversion operation of NRZ signals, the exemplary embodiments described herein employ Sagnac interferometers as NRZ wavelength converters. FIG. 1 is a high-level diagram of the structure of Sagnac interferometric loop 100 having SOA 101 at an asymmetric position. Input signal 10 is separated by 50:50 coupler 102 into clockwise (CW) component 11 and counter clockwise (CCW) component 12. CW and CCW components 11, 12 pass through SOA 100 at different times due to the asymmetric position of SOA 101 in loop 100. Polarization controller 103 is used to control the loop birefringence and the consequent interference when the two components (CW 11 and CCW 12) come back to 50:50 coupler 102.

For purposes of description, consider a wave plate with retardation $\phi$ and orientation $\theta$ (to account for the loop birefringence). CW component 11 and CWW component 12 experience a phase shift and gain of $\phi_{CW}$, $G_{CW}$ and $\phi_{CCW}$ and $G_{CCW}$, respectively. Input light 10 is linearly polarized with polarization direction $\alpha$. By incorporating different phase shifts and gains for the CW and CCW light components into the analysis of Sagnac loop 100, the transmission to the input optical signal can be expressed as:

$$T = \frac{1}{4}\{G_{CW} + G_{CCW} - 2\sqrt{G_{CW}G_{CCW}}\{[\cos(\varphi_{CCW} - \varphi_{CW})$$
$$(\cos^2(2\theta) + \cos\phi\sin^2(2\theta))] -$$
$$[\sin(\varphi_{CCW} - \varphi_{CW})\sin\phi\sin(2\theta)\sin(2\alpha)]\}\}$$
(Equation 1)

The transmission can also be expressed as:

$$T = \frac{1}{4}\{G_{CW} + G_{CCW} - 2A\sqrt{G_{CW}G_{CCW}}\cos(\varphi_{CCW} - \varphi_{CW} + \varphi_B)\}$$
(Equation 2)

where $A = \sqrt{(\cos^2(2\theta) + \cos\phi\sin^2(2\theta))^2 + (\sin\phi\sin(2\theta)\sin(2\alpha))^2}$ (Equation 3)

and $\varphi_B = \tan^{-1}\left(\frac{\sin\phi\sin(2\theta)\sin(2\alpha)}{\cos^2(2\theta) + \cos\phi\sin^2(2\theta)}\right).$ (Equation 4)

One of ordinary skill in the art will understand that the Transmission in Equations 1 and 2 above may also be expressed, respectively, as:

$$T = \frac{1}{4}\{G_{CW}^2 + G_{CCW}^2 - 2G_{CW}G_{CCW}\{[\cos(\phi_{CCW} - \phi_{CW})(\cos^2(2\theta)$$
$$= \cos\phi\sin^2(2\theta))] -$$
$$[\sin(\phi_{CCW} - \phi_{CW})\sin\phi\sin(2\theta)\sin(2\alpha)]\}\}$$
(Equation 5)

and $$T = \frac{1}{4}\{G_{CW}^1 + G_{CCW}^2 - 2AG_{CW}$$
$$G_{CCW}\cos(\phi_{CCW} - \phi_{CW} + \phi_\beta)\}$$
(Equation 6)

As shown in Equation 4, the phase bias of the interference can be tuned by adjusting the polarization of the input light and the loop birefringence. With a polarization controller, such as polarization controller 103, embodiments of the present invention can provide full tunability of the phase bias. One of skill in the art will understand that there are various methods to calculate the gain and phase change of light passing through the SOA. Due to the asymmetric position of SOA 101 in Sagnac loop 100, CW signal 11 reaches SOA 101 earlier than CCW signal 12 by a time delay of $\tau=2\Delta_{\chi SOA}/c_{fiber}$ where $\Delta_{\chi SOA}$ is the offset of SOA 101 from the center position of loop 100, and $c_{fiber}$ is the speed of light in the optical fiber.

Figure 2C:
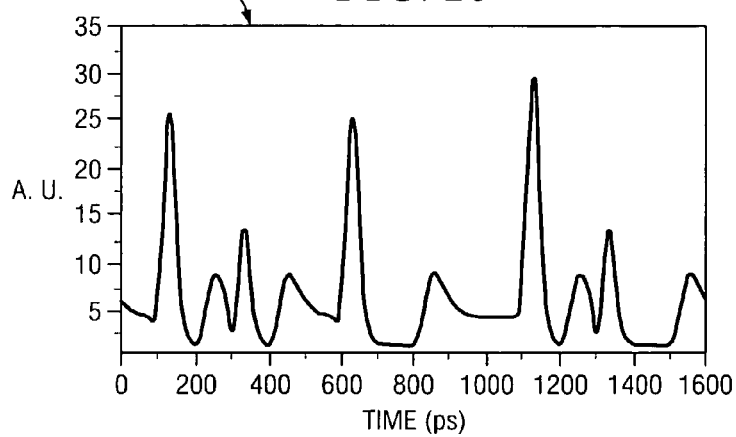
Figure 2D:
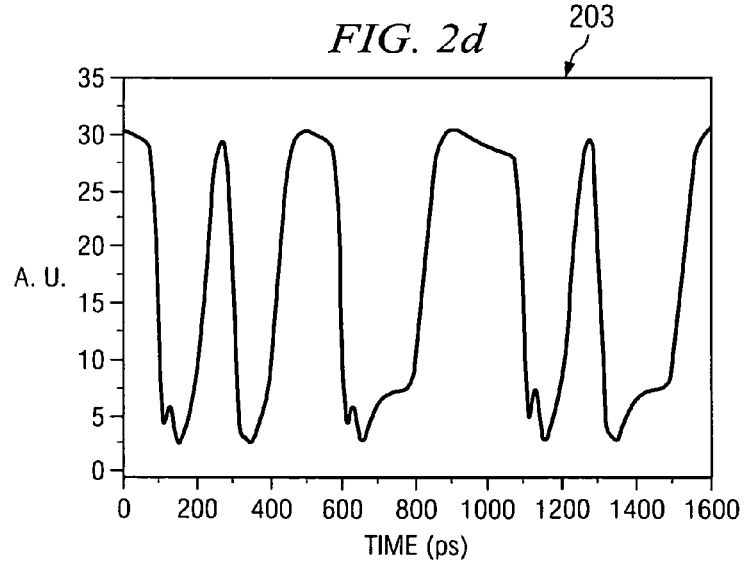

FIG. 2(a) illustrates exemplary input NRZ signal 200, which has a super Gaussian shape with peak power of 8 mW. In one embodiment of the invention, the following SOA parameters may be used: linewidth enhancement factor=4.0, saturation power=1.0 pJ, small signal gain=20 dB, SOA carrier lifetime=70 ps and the SOA offset from the loop center=20 ps. When a single SOA without being put into the Sagnac loop is used for wavelength conversion, converted signal 201 due to XGM effect is shown in FIG. 2(b). Signal 201 shows large fluctuations of the amplitude level of bit "1" which shows pattern-dependent effect caused by the slow SOA recovery rate. The problem can be solved by decreasing the SOA recovery time, which may pose difficulty on SOA fabrications. With a Sagnac interferometric structure adapted according to embodiments of the present invention, converted signals 202 and 203 shown in FIGS. 2(c) and (d) may be produced. In FIG. 2(c), the phase bias for the interference is set to be zero, which has been the working condition for the applications of optical switching and regeneration. FIG. 2(d) shows converted signal 203 for an optimal phase bias of −1.12, and shows reduced pattern dependent effect and improved extinction ratio compared with FIG. 2(b).

Figure 3:
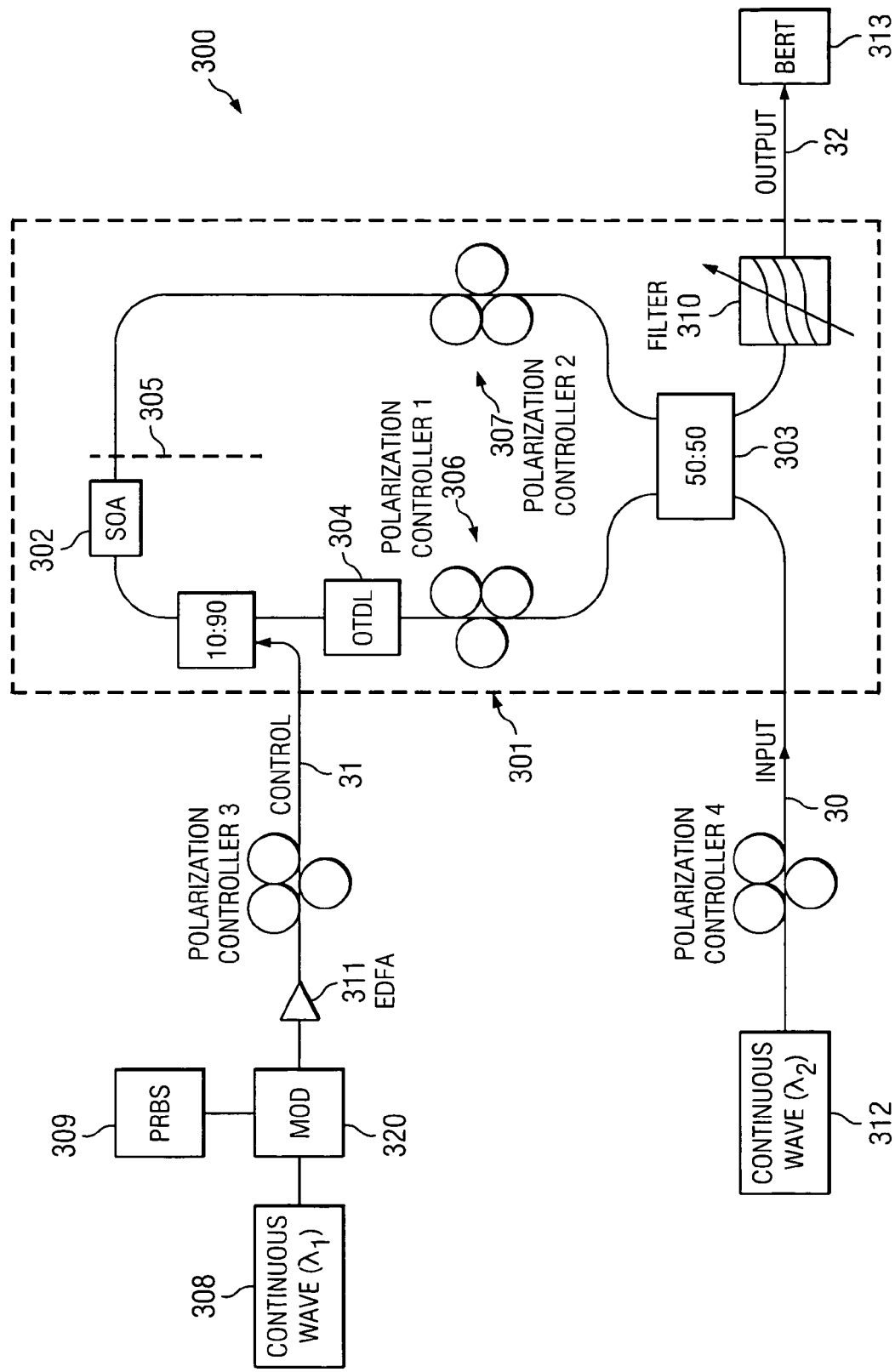
FIG. 3 is an illustration of an example signal converter employing a Sagnac interferometer, adapted according to various embodiments.

FIG. 3 illustrates an exemplary embodiment of the present invention, which can be used for experimental purposes. Because the embodiment is experimental, the term "control" may be used to describe the input NRZ signal before it is converted. Such description merely means that the signal is yet to be converted and does not imply that the signal performs a controlling function with regard to any of the optical components of signal converter 300.

Signal converter 300 includes Sagnac interferometer 301. SOA 302, such as an Alcatel 1901 with a working current of 195 mA, for example, is connected to the two output ports of 50:50 optical coupler 303. Optical tunable delay line (OTDL) 304 can be tuned to finely adjust the offset of SOA 302 from the loop center (graphically illustrated by line 305). Polarization controllers PC1 306 and PC2 307 are used to adjust the polarization of the light propagating in the CW and CCW directions. A NRZ data signal may be generated by modulating continuous wave light from source 308 with a 10 Gb/s pseudo random bit sequence with length of $2^{23}-1$ from source 309. The modulated light output from modulator 320 is amplified using a Erbium-doped fiber amplifier 311 and provided to the control port of loop 301. Continuous wave light from tunable laser source 312, such as an HP 8168C, for example, goes into input port 30 of Sagnac loop 301. Tunable bandpass filter 310 used in this embodiment has a 3 dB bandwidth of about 1 nm. The output of loop 301 is connected to bit error rate tester 313 in this experimental embodiment. Although various parameters and component models are specifically named with regard to FIG. 3, it should be understood that one skilled in the art may determine that other parameters and/or component models may be used to produce comparable signal conversion when used with a Sagnac loop interferometer with an asymmetrical SOA, and those alternate embodiments are within the scope of the present invention.

Figure 4A:
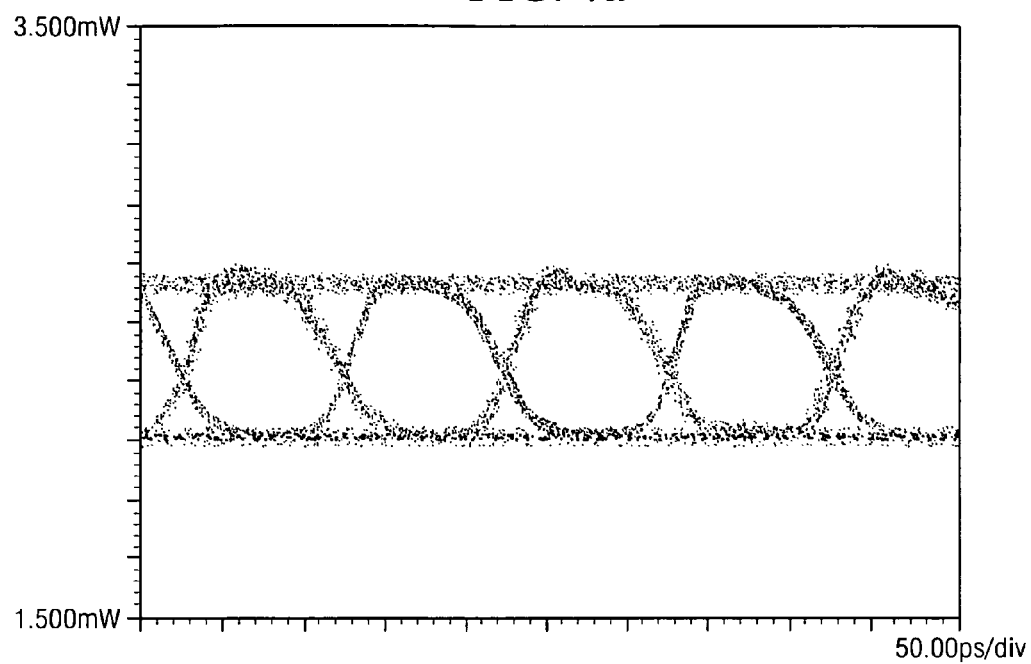
FIG. 4($a$) is an eye diagram of an input signal which may be used with one or more embodiments.
Figure 4B:
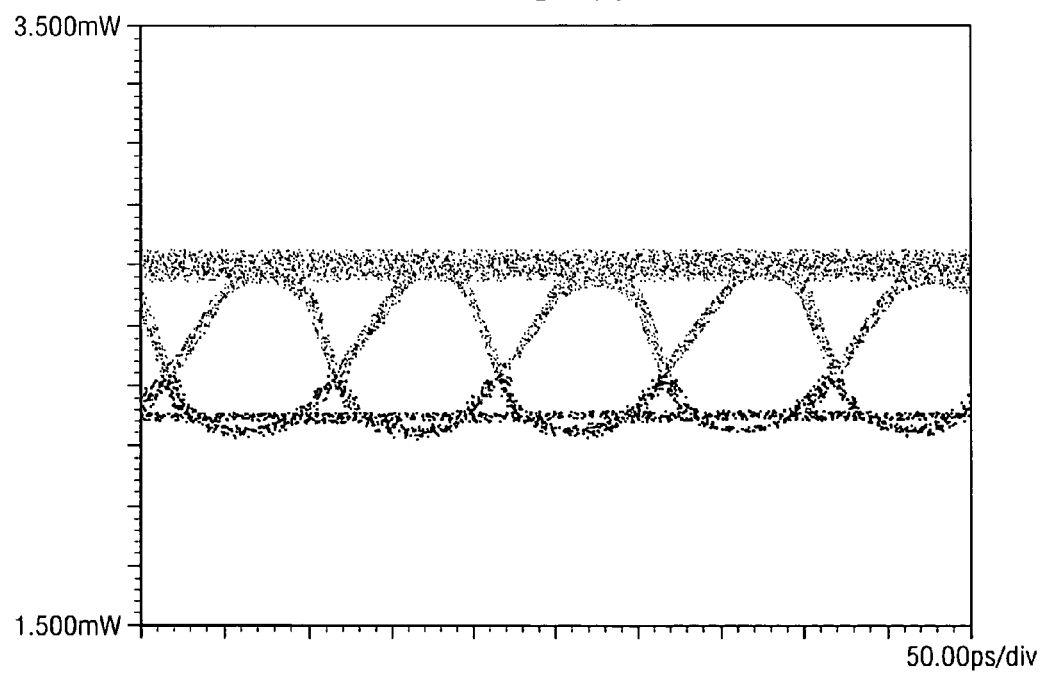
Figure 4C:
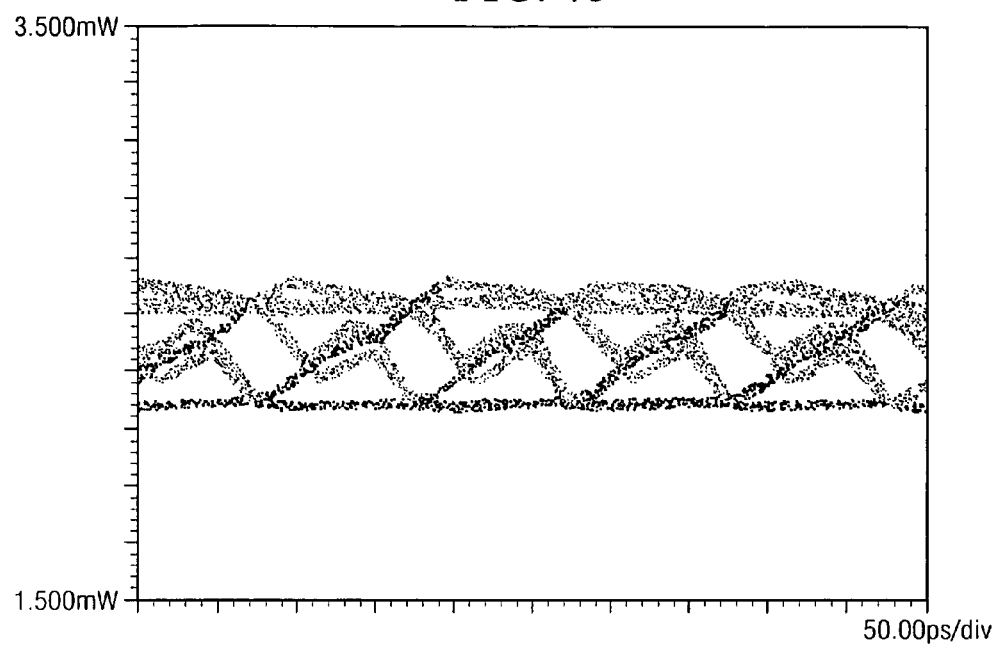
Figure 4D:
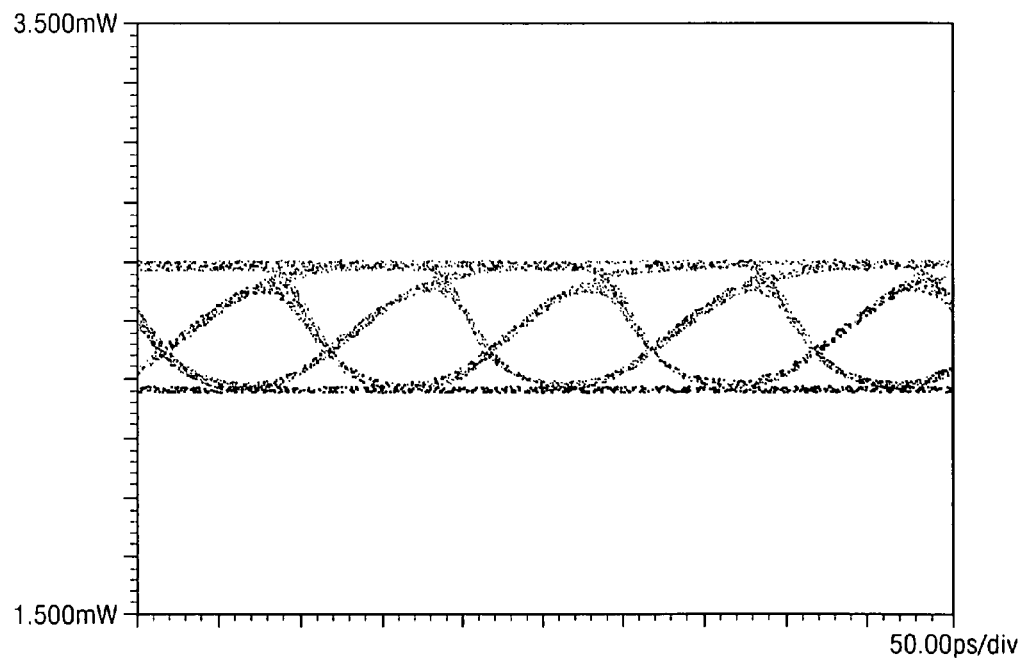

In the exemplary embodiment depicted in FIG. 3, the mean optical power of the control NRZ data signal 31 ($\lambda_1$=1545 nm) from laser source 308 is 5.3 dBm, and the optical power of the input light 30 ($\lambda_2$=1535 nm) from laser source 312 is −2.7 dBm. The wavelength of light 30 from laser source 312 determines the wavelength of the output data 32. In this embodiment, polarization controllers PC1 306 and PC2 307 are finely adjusted to optimize the wavelength converted signal. FIG. 4(a) is an eye diagram of input NRZ signal 31 in this embodiment. FIGS. 4(b) and (c) are eye diagrams of the wavelength converted signal 32 at 1535 nm when the SOA offset from the Sagnac loop center is 23 ps and 60 ps, respectively. As a comparison, wavelength conversion based on direct XGM effect using an SOA is conducted with optimized optical powers of the control data and the continuous wave light. The eye diagram of such converted data signal using XGM effect is shown in FIG. 4(d).

Figure 5C:
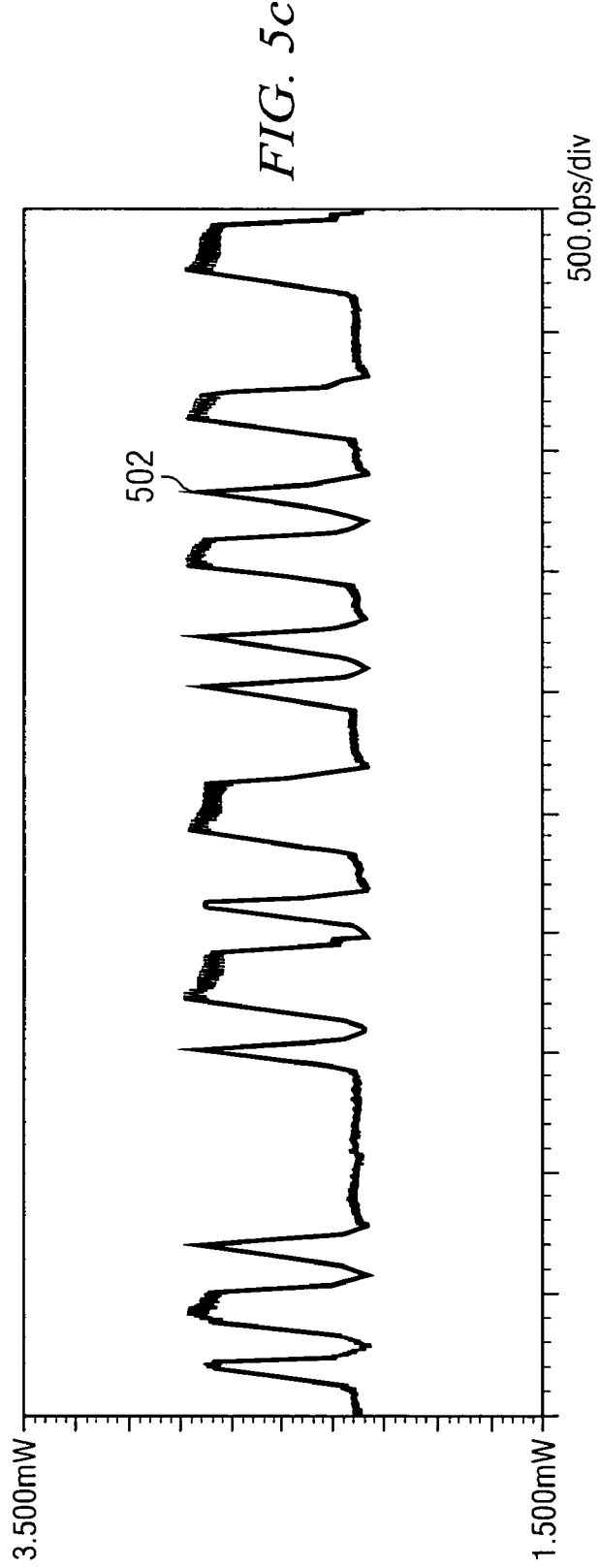
FIG. 5($a$) is an illustration of a data pattern of an input signal.

FIG. 5(a) is an illustration of the data pattern of input NRZ signal 500 used in this embodiment. FIG. 5(b) is an illustration of the data pattern of converted signal 501 using XGM effect, and FIG. 5(c) is an illustration of the data pattern of converted signal 502 using Sagnac interferometric loop 301 with offset SOA 302 (23 ps). Comparing FIGS. 5(b) and (c), it is clear that the pattern-dependent effect is alleviated with the Sagnac interferometric loop. When the offset of SOA 302 from loop center 305 is too large, the neighboring bits may interact with each other, causing the converted signal to deteriorate, as shown in FIG. 4(c). Note that the CW and CCW components reach SOA 302 with timing difference of 120 ps with an SOA offset of 60 ps.

Figure 6:
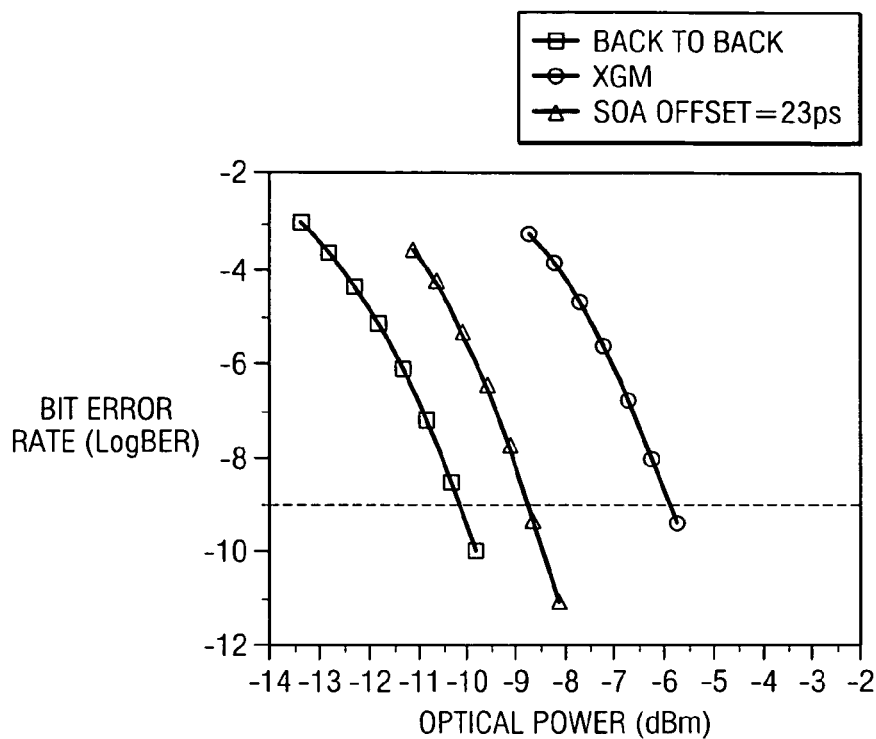
FIG. 6 is an illustration of the results of Bit Error Rate (BER) measurement of converted signals.
Figure 7:
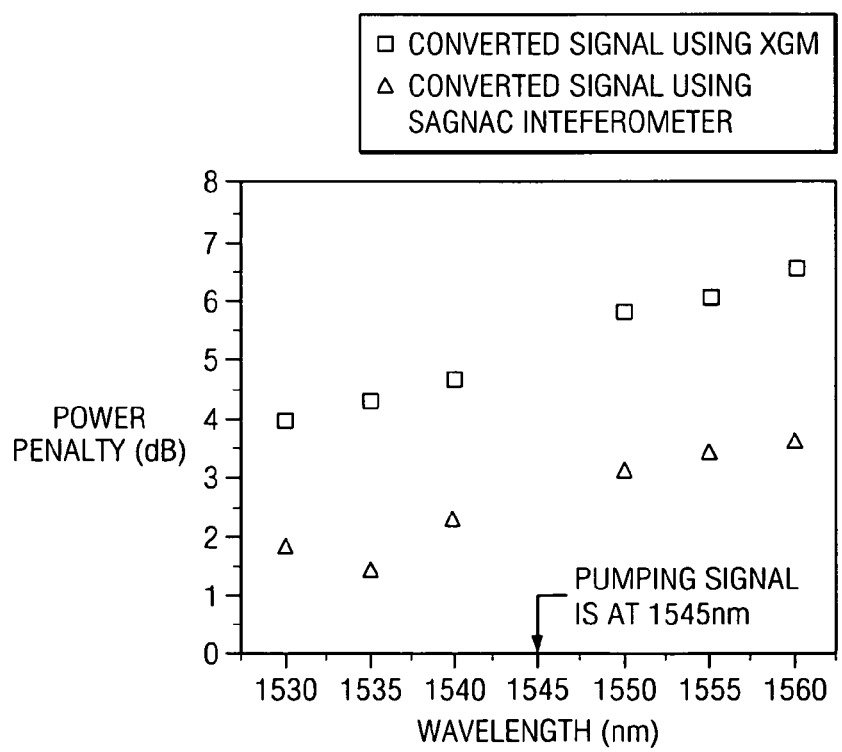
FIG. 7 is an illustration of the optical power penalty of converted signals at different wavelengths.

The results of Bit Error Rate (BER) measurement are shown in FIG. 6. The power penalties at $10^{-9}$ are 4.3 dB and 1.4 dB for converted signal 501 (using XGM effect) and for converted signal 502 (using Sagnac interferometric loop 301 of FIG. 3). The large power penalty of converted signal 501 from XGM effect is mainly due to the pattern-dependent effect. The optical power penalty of the converted signals 501 and 502 at different wavelength is shown in FIG. 7. Compared with XGM wavelength converters, Sagnac interferometric loop 301 with SOA 302 at an asymmetric position, as shown in FIG. 3, may reduce the power penalty by more than 2 dB.

Although the system depicted in FIG. 3 is a test setup, implementations of the invention in practical applications are possible. For instance, in one scenario, the control and output ports of the loop may be connected to a fiber transmission line in a telecommunications system. A continuous wave light (similar to light 30 from laser source 312 in FIG. 3) may then be input into the loop at the input port.

As explained earlier, the wavelength of the continuous-wave light determines the wavelength of the output signal. Accordingly, the incoming signal on the fiber transmission line is converted by the interferometric loop and output onto the fiber transmission line to be transmitted to its destination. This conversion may show improved performance with regard to the pattern dependent effect and extinction ratios than conversion performed through XGM effect on the same signal.

It is an advantage of some embodiments that they may be adapted for use in optical networks to provide 10 Gb/s and above signal conversion, thereby facilitating the development of present and future communication networks. In fact, various embodiments may be fully integratable with present and future optical networks.

In summary, various embodiments using a fiber-based Sagnac interferometric loop with an SOA at 10 Gb/s are illustrated. Theoretical analysis shows that the phase bias of the interference has important influence on the wavelength conversion operation. The converted signals from the Sagnac interferometric loop of FIGS. 1 and 3 may have improved performance compared with wavelength conversion using XGM effect.

Although the present invention and its advantages have been described in detail, it should be understood that various changes, substitutions and alterations can be made herein without departing from the invention as defined by the appended claims. Moreover, the scope of the present application is not intended to be limited to the particular embodiments of the process, machine, manufacture, composition of matter, means, methods and steps described in the specification. As one will readily appreciate from the disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A system comprising:
   a Sagnac interferometric loop;
   a semiconductor optical amplifier (SOA) located at an asymmetric position on the loop;
   a first polarization controller located before an input to the loop and operable to adjust polarization of an input signal; and
   a second polarization controller located within the loop and operable to adjust loop birefringence;
   wherein the Sagnac interferometric loop and the SOA are operable to perform signal conversion on the input signal.

2. The system of claim 1 wherein the Sagnac interferometric loop and the SOA are included in a signal converter in an optical communication network.

3. The system of claim 2 wherein the optical communication network employs optical time division multiplexing.

4. The system of claim 2 wherein the signal converter comprises:
   a 50:50 optical coupler in communication with the loop;
   an source for the input signal in communication with an input of the 50:50 optical coupler;
   a control signal source coupled to a 10:90 optical coupler, wherein the 10:90 optical coupler is in communication with the loop and operable to deliver a control signal to the loop;

two or more polarization controllers located on the loop, operable to tune a phase bias of interference in the loop; and an optical tunable delay line located on the loop operable to adjust an offset of the SOA from a center of the loop.

5. The system of claim 1 wherein the input signal is a non-return-to-zero signal.

6. The system of claim 1 wherein the converter outputs a converted signal with low levels of pattern dependent effect, wherein the low levels of pattern dependent effect are levels of pattern dependent effect lower than that which would be produced through use of XGM effect conversion with the SOA on the input signal and without the Sagnac interferometric loop.

7. The system of claim 1 wherein the Sagnac interferometric loop is implemented in a fiber optics communication network.

8. The system of claim 1 further comprising:
a tunable filter coupled to an output of the Sagnac interferometric loop.

9. The system of claim 1 further comprising:
an optical tunable delay line located within the loop.

10. A method comprising:
receiving an optical input signal into a Sagnac interferometric loop, wherein the loop includes a semiconductor optical amplifier (SOA) located at an asymmetrical position on the loop;
separating the optical input signal into a clockwise and a counterclockwise component in the loop, wherein each component reaches the SOA at a different time;
adjusting polarization of the optical input signal prior to said receiving step;
adjusting a loop birefringence, thereby tuning a phase bias of interference in the loop; and
outputting an optical converted signal.

11. The method of claim 10 further comprising adjusting an offset of the SOA from a center of the loop.

12. The method of claim 10 wherein the asymmetrical position is a position other than a center of the loop.

13. The method of claim 10 wherein adjusting polarization of an input signal is before an input to the loop.

14. The method of claim 10 further comprising:
tunably filtering the output optical converted signal.

15. The method of claim 10 further comprising:
tuning a delay line to adjust an offset of the SOA from the loop center.

16. A system comprising:
means for receiving an optical input signal into a Sagnac interferometric loop, wherein the loop includes a semiconductor optical amplifier (SOA) located at an asymmetrical position on the loop;
means for separating the optical input signal into a clockwise and a counterclockwise component in the loop, wherein each component reaches the SOA at a different time;
means for adjusting polarization of the input signal, wherein the means for adjusting polarization of the input signal is disposed before an input to the loop;
means for adjusting a loop birefringence, thereby tuning a phase bias of interference in the loop; and
means for outputting an optical converted signal.

17. The system of claim 16 further comprising:
means for tunably filtering the output optical converted signal.

18. The system of claim 16 further comprising:
means tuning a delay to adjust an offset of the SOA from the loop center.

* * * * *

UNITED STATES PATENT AND TRADEMARK OFFICE
CERTIFICATE OF CORRECTION

| | | |
|---|---|---|
| PATENT NO. | : 7,068,894 B2 | Page 1 of 1 |
| APPLICATION NO. | : 10/931931 | |
| DATED | : June 27, 2006 | |
| INVENTOR(S) | : Paul R. Prucnal et al. | |

It is certified that error appears in the above-identified patent and that said Letters Patent is hereby corrected as shown below:

In the Specification, Col. 1, line 18, the following sentence is hereby added:

The U.S. Government also has a paid-up license in this invention and the right in limited circumstances to require the patent owner to license others on reasonable terms as provided by the terms of grant number MDA-972-03-1-0006 awarded by the Defense Advanced Research Projects Agency.

Signed and Sealed this

Twenty-second Day of May, 2007

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 7,068,894 B2 | |
| APPLICATION NO. | : 10/931931 | |
| DATED | : June 27, 2006 | |
| INVENTOR(S) | : Paul R. Prucnal et al. | |

It is certified that error appears in the above-identified patent and that said Letters Patent is hereby corrected as shown below:

In the Specification, Col. 1, line 18, the following sentence is hereby added:

The U.S. Government also has a paid-up license in this invention and the right in limited circumstances to require the patent owner to license others on reasonable terms as provided by the terms of grant number MDA-972-03-1-0006 awarded by the Defense Advanced Research Projects Agency.

Signed and Sealed this

Fifth Day of June, 2007

JON W. DUDAS
*Director of the United States Patent and Trademark Office*